United States Patent [19]

Huang et al.

[11] Patent Number: 5,354,567

[45] Date of Patent: * Oct. 11, 1994

[54] SEALANT FOR BAKED PRODUCTS

[75] Inventors: Victor T. Huang, Moundsview; Barbara J. Timm-Brock, Shoreview; Rhonda S. Sward, St. Paul; Laura M. Hansen, Vadnais Heights; Sylvia Abrams, Brooklyn Center; Karin C. Gaertner, Andover, all of Minn.

[73] Assignee: The Pillsbury Company, Minneapolis, Minn.

[*] Notice: The portion of the term of this patent subsequent to Oct. 19, 2010 has been disclaimed.

[21] Appl. No.: 105,076

[22] Filed: Aug. 10, 1993

Related U.S. Application Data

[62] Division of Ser. No. 890,062, May 28, 1992, Pat. No. 5,254,353.

[51] Int. Cl.⁵ .................................................. A23P 1/08
[52] U.S. Cl. ...................................... 426/94; 426/138
[58] Field of Search .................. 426/138, 94, 302, 658

[56] References Cited

U.S. PATENT DOCUMENTS 5,254,353 10/1993 Huang .................................. 426/94

Primary Examiner—Carolyn Paden
Attorney, Agent, or Firm—Amy J. Hoffman; Aleya Rahman

[57] ABSTRACT

A sealant for baked goods which reduces the moisture migration into and out of the baked good comprising 40–72% sucrose by weight, 8–30% starch hydrolysate by weight having a DE of 38 or less, and 20–30% water by weight wherein 70–80% of the barrier is comprised of solids. A method for producing the sealant is also disclosed.

2 Claims, No Drawings

SEALANT FOR BAKED PRODUCTS

This application is a division of Ser. No. 07/890,062, filed May 28, 1992 now U.S. Pat. No. 5,254,353.

BACKGROUND

The present invention relates to sealants for baked goods. In particular, the invention provides a sugar, water, and starch hydrolysate composition which when applied to baked goods as a coating reduces the rate of moisture transmission into and out of baked goods.

In the bakery area, continual efforts are directed toward producing appetizing products which must be pleasing to both the eye and to the palate. Bakers have historically been plagued by the desiccation of baked goods and by the deteriorating appearance of frosting, icing or glaze on goods such as cakes, rolls, donuts, strudels, pastries, croissants, biscuits, petit fours, or brownies to name a few.

Deteriorating appearance and taste of baked goods is in part due to moisture migrating from the product's high moisture content area to an area with reduced moisture content. For cakes, this usually means that moisture migrates from the cake into the glaze or icing. Not only does this moisture migration result in a drier cake, it also results in a wetter glaze or icing which has deleterious effects on the product's appearance. When the water content of the icing increases, the icing loses its ability to remain on the cake and slides down the side of the cake. If the icing is on a flat horizontal surface the moisture pools on the surface and causes the sugar within the icing to dissolve in the water. This causes the icing or glaze to become patchy or nonexistent in places where the moisture has pooled thus making the product appear as if its shelf life has been exceeded. For the purposes of this disclosure, an icing is defined as "degraded" when the glaze or icing dissolves, becomes patchy, wrinkled or slides down the side of the cake.

Bakers have known of the problems of icing deteriorating and baked goods desiccating for years. They have also known these problems were caused in part by moisture migrating from the baked good either into the atmosphere or into the icing. Bakers attempted to solve the problem by coating the baked good with a sealant which was applied to the baked product before icing or glaze was applied. Early sealants included fats, waxes, and simple syrups. Although fats and waxes worked well as sealants they created an undesirable mouthfeel and opaque appearance. Additionally, they were unsuitable because glazes or icings did not readily adhere to the slick surfaces.

Simple syrups were also used as sealants. Recipes exist for simple syrups in which sugar, water and corn syrup are combined. The corn syrup which has been used in these recipes is that which can be purchased in the supermarket such as Karo (TM) Corn Syrup (Best Foods, Englewood Cliffs, N.J.). This corn syrup is a mixture of 38 to 52 dextrose equivalent (DE) corn syrups combined with high fructose corn syrup for sweetness and vanilla for flavor. Such a corn syrup is quite fluid for handling ease. Lower DE starch hydrolysates have not been used to prepare simple syrups because they are too viscous, too difficult to handle, and not readily available. The simple syrups prepared using commercially available corn syrups such as Karo (TM) were marginally effective as sealants. They did not prevent moisture migration over prolonged shelf life nor did they sufficiently prevent moisture migration from products with high water activity.

Therefore, a need exists for a sealant which overcomes the shortcomings of the existing art. The present invention, a sealant composition which when applied to baked goods is transparent and reduces the moisture migration from baked goods either into the atmosphere or into glazes or icings is unique. Further, a sealant which does not produce an undesirable mouthfeel and can maintain the sealing capability over prolonged shelf life to produce a commercially suitable product is novel.

SUMMARY

A composition for a sealant is disclosed which when applied to a baked good reduces the migration of moisture into and out of the baked good. The sealant is comprised of about 40–72% sugar by weight, about 8–30% starch hydrolysate by weight with a DE of less than about 38, and about 20–30% water by weight. The sealant has a total solids content of about 70–80%. The sealant is applied to a baked good as a coating and thus prevents desiccation of the baked good. Icing or glaze may be applied after the sealant has been applied, however, icing is optional. Advantageously, due to the composition of the sealant, the sealant may be added to a warm baked good thus reducing the amount of moisture migration which occurs during cooling. A method of producing the sealant is also disclosed.

DETAILED DESCRIPTION OF THE INVENTION

The present invention provides a composition for a sealant which when applied to a baked good creates a moisture barrier and is effective in reducing moisture migration both into and out of baked goods. This sealant is useful on any baked good which dries out over extended shelf life or on any baked good which is iced or glazed wherein the icing or glaze has a different water activity than the baked good. The term "baked good" as used for the purposes of this invention includes but is not limited to cakes, petit fours, rolls, donuts, strudels, pastries, croissants, biscuits, and brownies.

The sealant of the invention comprises about 40–72% by weight sugar, about 8–30% by weight starch hydrolysate which has a DE of less than about 38, and about 20–30% by weight water. The sealant has a total solids content of about 70–80%. Preferably, the sealant is comprised of about 40–55% by weight sugar, about 15–25% by weight starch hydrolysate of about 38 DE or less, and about 20–24% by weight water. It was surprisingly found that sealants which were prepared with a starch hydrolysate of less than about 38 DE and then applied to a baked good were considerably more effective in reducing moisture migration either into or out of the baked good than their counterparts prepared with starch hydrolysates of greater than about 38 DE. It was further discovered that the effectiveness of the sealant in preventing moisture migration was dependent upon the DE of the starch hydrolysate used to prepare the sealant. The lower the DE of starch hydrolysate used to prepare the sealant, the more effective the sealant was in preventing moisture migration.

Generally, starch hydrolysates of greater than about 20 DE are known as corn syrups while starch hydrolysates of less than about 20 DE are known as maltodextrins. As the DE decreases, the starch hydrolysate becomes more viscous and less sweet. Any starch hydrolysate of less than about 38 DE is suitable for the purposes of this invention. Sealants prepared with low DE starch hydrolysates such as maltodextrins act as excellent moisture barriers but are extremely viscous and difficult to apply to a baked good. Preferably, starch hydrolysates of about 26 DE are used to prepare the sealant; 26 DE starch hydrolysates produce a sealant which is easily applied to the baked good and acts as a moisture barrier for a prolonged period of time. Manufacturers such as A. E. Staley Manufacturing Company (Decatur, Ill.) will provide starch hydrolysates within the DE range necessary to practice the invention.

The sealant may be applied to a baked good at any temperature including a just-baked good down to a chilled good. Logically, if the sealant is applied to a warm baked good, the sealant will retain that moisture which would normally escape from the baked good during cooling. Therefore, applying the sealant to a warm baked good will result in greater moisture retention over a prolonged shelf life because the product begins with a higher moisture content.

The following examples illustrate the effectiveness of the sealant of the present invention when placed on a cake and then stored for up to 5 weeks at refrigeration and at ambient temperatures.

EXAMPLE I

Starch hydrolysates ranging up to about 52 DE were used to prepare sealants in order to determine the ability of the sealant to reduce moisture migration out of cakes. Preparation of the sealants is first outlined followed by the preparation of the cakes and glaze and a discussion of the results after 5 weeks storage at about 40–45 degrees F.

The ingredients used to prepare the sealants were as follows:

| Ingredient | % by weight |
| --- | --- |
| Sugar | 40–56% |
| Starch Hydrolysate | 8–25% |
| Water | 30–40% |

Any type of sugar except invert sugar may be used to prepare the sealant. Preferably, sucrose is used.

The above ingredients were combined and brought to a boil over medium to high heat at ambient pressure until the sugar was fully dissolved. Alternatively, the above ingredients could be boiled under a vacuum in order to dissolve the sugar.

The combination was reduced until about 70% to about 80% total solids content was reached as measured by a refractometer as manufactured by Bausch & Lomb Co. (Oakland, Md.). Any means of reducing the combination to achieve about 70–80% total solids content may be used to practice the invention. These means include but are not limited to boiling or heating the combination under ambient pressure, boiling under a vacuum, or using an evaporator.

After the dissolution and reduction, the sealant had a final ingredient concentration in the following range: about 40–72% by weight sugar, about 8–30% by weight starch hydrolysate, and about 20–30% by weight water. Preferably the sealants had a final composition of about 40–55% by weight sugar, about 15–25% by weight starch hydrolysate, and about 20–24% by weight water. The sealants were then set aside.

Lemon cakes were prepared to test the effectiveness of the sealant of the invention. Lemon-flavored cake and glaze was chosen because it has historically demonstrated large problems with moisture migration as evidenced by glaze degradation. The lemon cake had the following formula and was prepared as outlined below:

| Ingredient | % by weight |
| --- | --- |
| Emulsified Shortening | 15.56 |
| Sugar | 27.50 |
| Non-fat Milk Solids | 1.62 |
| Whole Eggs (beaten) | 11.45 |
| Water | 13.16 |
| Cake Flour | 27.55 |
| Sodium Bicarbonate | 0.51 |
| Gluconodelta Lactone | 1.08 |
| Lemon Extract | 1.50 |
| Yellow Color | 0.07 |

The non-fat dry milk, sugar, and shortening were creamed together for about 3 minutes. The eggs were added and the mixture was beaten for about 2 minutes. The water, lemon extract, and yellow coloring were combined and added to the above and then the resulting mixture was mixed for about 2–3 minutes until a homogenous creamy liquid was obtained. Meanwhile, the cake flour, sodium bicarbonate and gluconodelta lactone were premixed and added to the other hydrated ingredients. The resulting mixture was mixed about 3–5 minutes until a batter of smooth consistency was obtained. Ninety to one hundred grams of batter was then placed in a lightly greased pan and baked at 350 degrees F. for about 20 to 24 minutes or until golden brown.

The cakes were cooled in the pan for about 15 minutes. After removing the cakes from the pans, the cakes were cooled for one hour before the sealant was applied.

The sealants were cooled to about 80 to 130 degrees F. before applying to a cake. The sealant may be applied to a baked good at any temperature. However, the sealant is preferably at about 105 degrees F. during application thereby making the sealant more fluid than at a cooler temperature and easier to apply. Lower application temperatures result in a thicker coating of the sealant and require more sealant to achieve the same coverage. The thicker sealant is more effective in reducing moisture transmission but is also less appealing because it is easily detected by the consumer.

About five to ten grams of sealant, preferably nine grams was applied per 100 gram lemon cake. The sealant of the present invention may be applied to a baked good in any suitable manner to evenly coat a baked good. Examples of application methods include but are not limited to spraying, dipping, brushing, or pouring the sealant onto the baked good. Preferably, the sealant is applied by pouring the sealant onto the baked good or dipping the baked good into a vat of the sealant.

The sealant was applied to completely cover the top surface of the cakes, therefore, the about nine to ten grams of sealant was spread to cover about 180 square centimeters of cake. A control cake was prepared to which the sealant was not applied to the cake.

The following glaze was prepared:

| Ingredient | % by weight |
| --- | --- |
| Powdered Sugar | 82.50 |
| Lemon Juice | 17.40 |

| Ingredient | % by weight |
| --- | --- |
| Yellow Coloring | 0.10 |

All ingredients were combined and mixed about 3 minutes or until a smooth consistency was obtained. About 20 to 25 grams of the glaze was then applied to the cakes coated with sealant and also to the control cake.

The cakes were stored for up to about 5 weeks at about 45 degrees F. each in a separate substantially controlled environment. Moisture migration was determined empirically by assessing whether or not the glaze or icing degraded. If the glaze degraded, moisture had migrated through the sealant and into the glaze.

Glaze degradation was observed within about 14 days on the control cake. It was surprisingly found that sealants which were prepared with a starch hydrolysate of less than about 38 DE were considerably more effective in reducing moisture migration either into or out of the baked good than their counterparts prepared with starch hydrolysates of greater than about 38 DE. Cakes with sealants prepared with less than about 38 DE starch hydrolysate did not exhibit glaze degradation even after about 35 days. The cakes with sealants prepared with greater than about 38 DE starch hydrolysate exhibited glaze degradation within about 17 days showing they were little more effective than not using a sealant.

EXAMPLE II

Example I was repeated except that the cakes were stored at about 70 to 75 degrees F. each in a separate substantially controlled environment.

Glaze degradation was observed within about 3-5 days on the control cake. Cakes with sealants prepared with greater than about 38 DE starch hydrolysate exhibited glaze degradation within about 5-7 days. The glaze on cakes with sealants prepared with less than about 38 DE starch hydrolysate performed substantially better than the control or the higher DE containing sealants. The glaze on cakes which used the sealant of the invention did not degrade until about 10-14 days had passed.

We claim:

1. A baked product comprising a coating of a sealant composition, said sealant composition consisting essentially of about 40-72% sugar by weight, about 8-30% starch hydrolysate by weight having a DE of less than about 38, and about 20-30% water by weight wherein about 70-80% of the sealant composition is comprised of solids, said sealant composition being effective as a moisture barrier on the baked product.

2. The baked product of claim 1, wherein the sealant composition consists essentially of about 40-50% sugar by weight, about 15-25 % starch hydrolysate by weight having a DE of less than about 38, and about 20-24% water by weight wherein about 76-80% of the sealant composition is comprised of solids.

* * * * *